E. I. CUSTER.
AUTOMOBILE AXLE SECURING MEANS.
APPLICATION FILED SEPT. 21, 1914. RENEWED MAY 14, 1918.

1,288,527.

Patented Dec. 24, 1918.
2 SHEETS—SHEET 1.

Witnesses
Wynne Johnson
G. E. Jarvis

Inventor
Eugene I. Custer
By
C. L. Parker, Attorneys

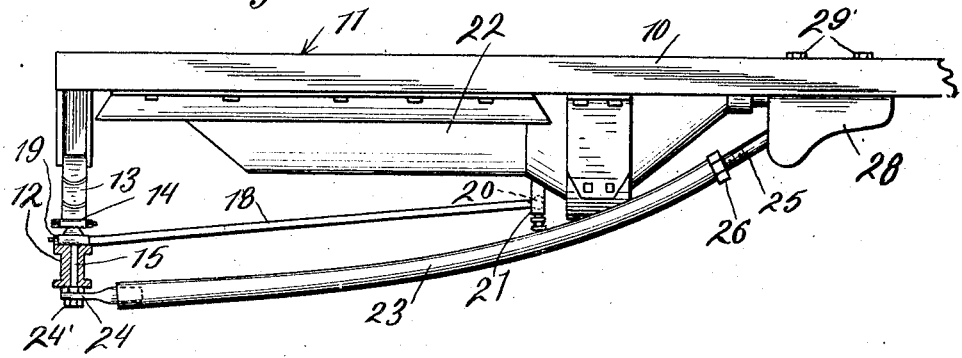
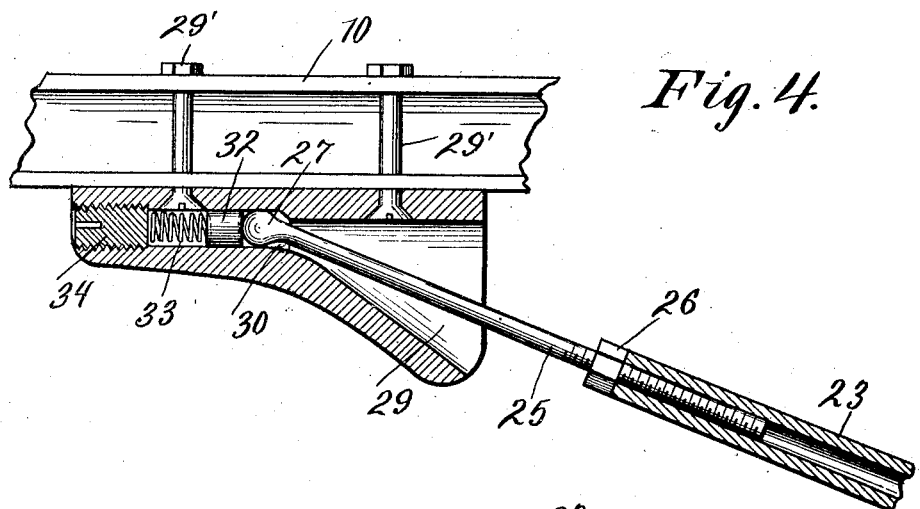
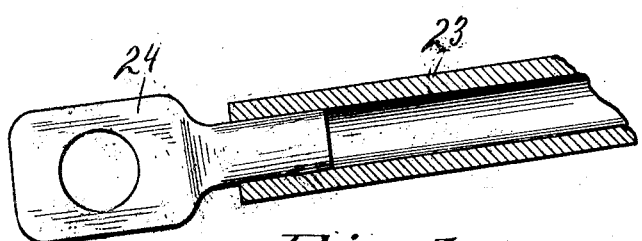

UNITED STATES PATENT OFFICE.

EUGENE I. CUSTER, OF PLAINVIEW, NEBRASKA, ASSIGNOR OF TWO-FIFTHS TO ARTHUR JENSEN, OF RODNEY, IOWA.

AUTOMOBILE-AXLE-SECURING MEANS.

1,288,527.	Specification of Letters Patent.	Patented Dec. 24, 1918.

Application filed September 21, 1914, Serial No. 862,698. Renewed May 14, 1918. Serial No. 234,535.

*To all whom it may concern:*

Be it known that I, EUGENE I. CUSTER, a citizen of the United States, residing at Plainview, in the county of Pierce and State of Nebraska, have invented certain new and useful Improvements in Automobile-Axle-Securing Means, of which the following is a specification.

My invention relates to improvements in means for securing the front axle of an automobile, preferably the Ford automobile, to the frame of the same.

An important object of the invention is to provide means of the above mentioned character, which will take up excessive strains ordinarily transmitted to the angularly arranged radius rods connected with the front axle of the Ford automobile preventing the same from becoming damaged; hold the front axle against displacement such as turning upon its longitudinal axis; and absorb excessive shocks before the same are transmitted to the frame of the automobile without interfering with the usual operation of the springs in absorbing vertical vibrations and the like.

A further object of the invention is to provide means of the above mentioned character, embodying a yieldable member, with means to regulate the tension of the same.

A further object of the invention is to provide means of the above mentioned character, which are simple in construction, inexpensive to manufacture, and convenient in use.

Other objects and advantages of the invention will be apparent during the course of the following description.

Figure 1:
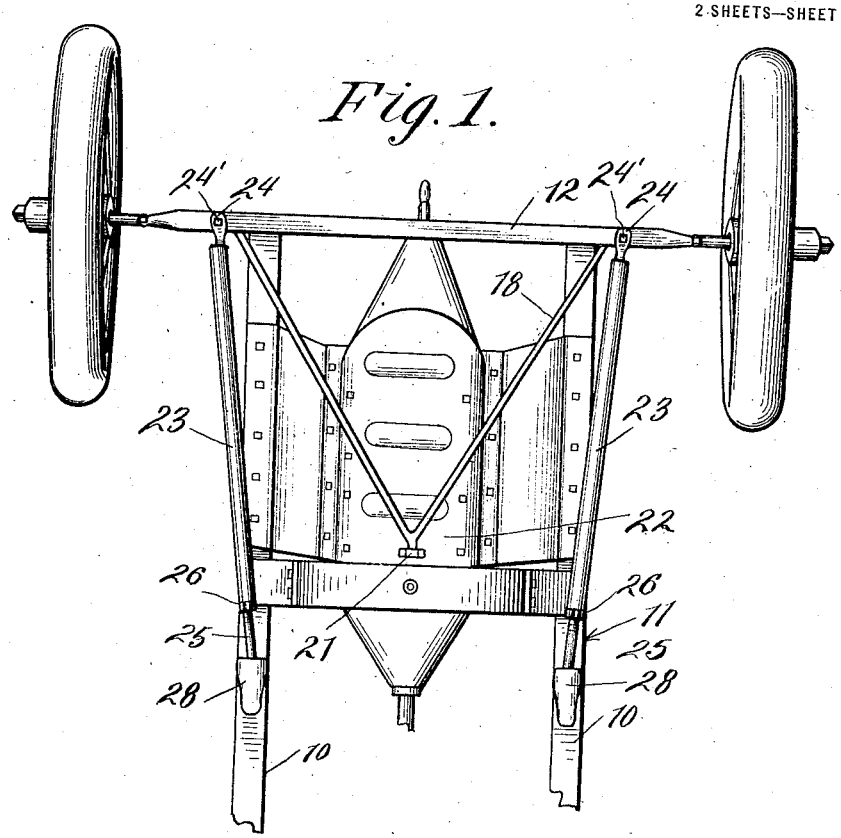
Figure 3:
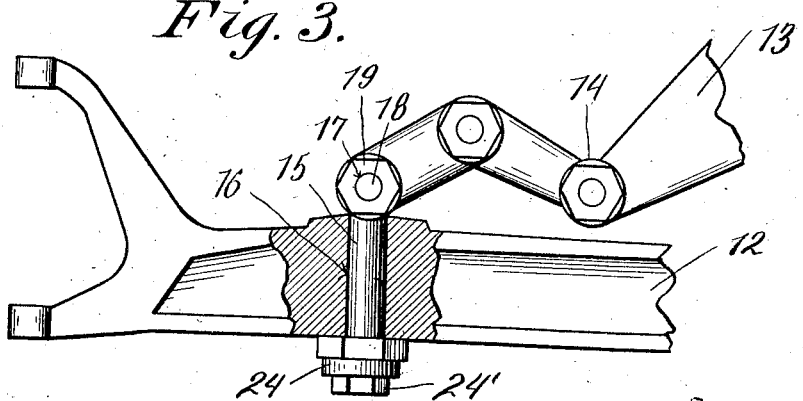

In the accompanying drawings forming a part of this specification and in which like numerals are employed to designate like parts throughout the same, Figure 1 is a bottom plan view of a portion of the frame of a Ford automobile, showing my invention applied thereto, Fig. 2 is a side elevation of the same, Fig. 3 is a detail section through the front axle, associated elements being shown in elevation, Fig. 4 is a central longitudinal sectional view through pivot means included in the invention, and, Fig. 5 is a fragmentary plan view, partly in section, of one of the reinforcing radius-rods, included in the invention.

In the drawings, wherein for the purpose of illustration is shown a preferred embodiment of my invention, the numeral 10 designates longitudinal beams of a frame 11, of a Ford automobile. The forward end of this frame is arranged above and near a front axle 12, and is connected therewith by means of a leaf spring 13, as is well known. As clearly shown in Fig. 3, each end of the leaf spring 13 has connection with an inwardly extending head 14, rigidly connected with a vertical bolt 15, passing through a vertical opening 16, formed in the front axle 12, near the end thereof. The vertical bolts 15 are provided in their upper ends, at the top of or above the front axle with horizontal openings 17, receiving the reduced ends of angularly arranged radius-rods 18, which are clamped therein by means of nuts 19 or the like. The radius-rods 18 converge inwardly and are provided with a ball 20, preferably formed integral therewith, mounted to turn within a socket 21, rigidly attached to the crank case 22. The above description represents generally the ordinary construction of the Ford automobile.

My improvement or invention comprises preferably tubular reinforcing radius-rods 23, provided at their forward ends with flat apertured heads 24 rigidly secured thereto and receiving the lower ends of the vertical bolts 15, and clamped thereto by nuts 24' or the like.

The reinforcing radius-rods 23 converge inwardly slightly, but their inner ends are arranged outwardly of the inner ends of the radius-rods 18, as more clearly shown in Fig. 1.

Each of the reinforcing radius-rods 23 is longitudinally adjustable or extensible, and the same has its inner end internally screw-threaded for engaging with the screw-threaded end of an extension or rod 25, as shown. The extension 25 carries a lock nut 26, serving to positively hold the extension 25 against improper rotation. At its inner end, the extension 25 is provided with a ball or spherical head 27, as shown.

Arranged below each of the longitudinal beams 10 is a housing or casting 28, rigidly secured thereto by means of bolts 29' or the like. The housing 28 is provided with a vertical axially extending opening 29, for receiving the extension 25, and a restricted axial opening 30 for receiving the head 27 and associated elements, as shown. Arranged within the opening 30 is a longitudinally adjustable bearing 32, which is preferably cylindrical, and is provided with a concave face, engaging the ball 27. A compressible coil spring 33 is arranged within the axial opening 30, and engages the bearing 32, the tension of this spring being regulated by a screw-threaded plug 34, engaging the outer screw-threaded portion of the opening 30, as shown.

In operation, my reinforcing radius-rods 23 serve to oppose the turning movement of the front axle upon its longitudinal axis, thus taking excessive strain off of the main radius rods 18. As is well known, such turning movement renders the automobile difficult and dangerous to steer. By having a pivotal or universal connection with the frame, the reinforcing radius-rods 23 are capable of swinging in a vertical plane, whereby they do not interfere with the operation of the spring 13, in absorbing vertical shocks. The springs 33 serve to yieldingly oppose the longitudinal movement of the reinforcing radius-rods 23, thus protecting the same against excessive shocks or strains. The tension of the springs 33 may be regulated by turning or adjusting the plug 34, as is obvious.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having thus described my invention, I claim:—

The combination with the front axle of an automobile provided near its ends with substantially vertical openings, of vertical bolts extending through the openings, forwardly diverging radius rods having their forward ends secured to the tops of the bolts, means connecting the inner ends of the radius rods with the frame of the automobile, forwardly diverging auxiliary radius rods having their forward ends connected with the lower ends of the bolts and their rear ends spaced laterally and outwardly a substantial distance beyond the inner ends of the first named radius rods, each auxiliary radius rod comprising a tubular body portion and an extension rod having screw-threaded engagement within the tubular body portion to be longitudinally adjustable and provided at its free end with a spherically curved head, a housing attached to the frame of the automobile and having a main opening to receive the extension rod and a reduced opening for the reception of the head thereof, a reciprocatory member arranged within the reduced opening, and a spring to oppose the movement of the reciprocatory member.

In testimony whereof I affix my signature in presence of two witnesses.

EUGENE I. CUSTER.

Witnesses:
  W. L. Mote,
  Ross A. Mote.